United States Patent
Ahner et al.

(10) Patent No.: US 10,766,805 B2
(45) Date of Patent: Sep. 8, 2020

(54) EDGE POLISHING A GLASS SUBSTRATE AFTER CUTTING

(71) Applicant: Seagate Technology LLC, Cupertino, CA (US)

(72) Inventors: Joachim Walter Ahner, Livermore, CA (US); David Marcus Tung, Livermore, CA (US); Daniel T. Jennings, San Jose, CA (US); Robin Davies, Livermore, CA (US); Ian J. Beresford, Milpitas, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 283 days.

(21) Appl. No.: 15/792,279

(22) Filed: Oct. 24, 2017

(65) Prior Publication Data

US 2019/0039170 A1 Feb. 7, 2019

Related U.S. Application Data

(60) Provisional application No. 62/542,216, filed on Aug. 7, 2017, provisional application No. 62/542,232, filed
(Continued)

(51) Int. Cl.
| | |
|---|---|
| *B23K 10/00* | (2006.01) |
| *C03B 33/10* | (2006.01) |
| *C03B 33/08* | (2006.01) |
| *B23K 26/00* | (2014.01) |
| *B23K 26/042* | (2014.01) |
| *B23K 26/046* | (2014.01) |
| *B23K 26/06* | (2014.01) |
| *B23K 26/067* | (2006.01) |
| *B23K 26/08* | (2014.01) |
| *B23K 26/38* | (2014.01) |
| *B23K 26/402* | (2014.01) |
| *B23K 26/361* | (2014.01) |

(Continued)

(52) U.S. Cl.
CPC .......... *C03B 33/102* (2013.01); *B23K 10/003* (2013.01); *B23K 26/0006* (2013.01); *B23K 26/042* (2015.10); *B23K 26/046* (2013.01); *B23K 26/064* (2015.10); *B23K 26/067* (2013.01); *B23K 26/0643* (2013.01); *B23K 26/0648* (2013.01); *B23K 26/0676* (2013.01); *B23K 26/0853* (2013.01); *B23K 26/3576* (2018.08); *B23K 26/361* (2015.10); *B23K 26/38* (2013.01); *B23K 26/402* (2013.01); *C03B 33/0222* (2013.01); *C03B 33/082* (2013.01); *B23K 2103/54* (2018.08)

(58) Field of Classification Search
CPC . C03B 33/102; C03B 33/0222; C03B 33/082; B23K 10/003; B23K 26/3576; B23K 26/042; B23K 26/084; B23K 26/361; B23K 26/0006; B23K 26/046; B23K 26/0643; B23K 26/0648; B23K 26/0853
USPC .............. 219/121.41, 121.59, 121.6, 121.65, 219/121.68, 121.66
See application file for complete search history.

(56) References Cited

U.S. PATENT DOCUMENTS

| | | | |
|---|---|---|---|
| 6,406,589 B1 * | 6/2002 | Yanagisawa ...... | H01J 37/32357 156/345.3 |
| 6,845,635 B2 * | 1/2005 | Watanabe .......... | B23K 26/0604 219/121.6 |

(Continued)

*Primary Examiner* — Mark H Paschall
(74) *Attorney, Agent, or Firm* — Holzer Patel Drennan

(57) ABSTRACT

A method includes projecting energy onto an annular edge of a glass substrate. The annular edge includes a first roughness. The first roughness is reduced to a second roughness with the energy. The energy reduces the first roughness without changing a roundness of the annular edge of the glass substrate.

15 Claims, 21 Drawing Sheets

Related U.S. Application Data on Aug. 7, 2017, provisional application No. 62/542,235, filed on Aug. 7, 2017.

(51) Int. Cl.
  *B23K 26/352* (2014.01)
  *B23K 26/064* (2014.01)
  *C03B 33/02* (2006.01)
  *B23K 103/00* (2006.01)

(56) References Cited

U.S. PATENT DOCUMENTS

| | | | |
|---|---|---|---|
| 9,676,167 B2 | 6/2017 | Marjanovic et al. | |
| 9,686,861 B2 | 6/2017 | Ma et al. | |
| 9,687,936 B2 | 6/2017 | Marjanovic et al. | |
| 9,707,658 B2 | 7/2017 | Darcangelo et al. | |
| 9,764,979 B2 * | 9/2017 | Fujii | C03B 33/0222 |
| 10,017,410 B2 * | 7/2018 | Hosseini | B23K 26/0617 |
| 2008/0202167 A1 * | 8/2008 | Cavallaro | B23K 26/0736 65/104 |
| 2011/0139759 A1 * | 6/2011 | Millman, Jr. | B23K 26/0676 219/121.72 |
| 2014/0027951 A1 * | 1/2014 | Srinivas | B29C 59/16 425/174.4 |
| 2015/0232369 A1 * | 8/2015 | Marjanovic | C03B 33/0215 428/192 |
| 2018/0105451 A1 * | 4/2018 | Wieland | B23K 26/082 |
| 2019/0144325 A1 * | 5/2019 | Bowden | C03B 33/0222 219/121.69 |

* cited by examiner

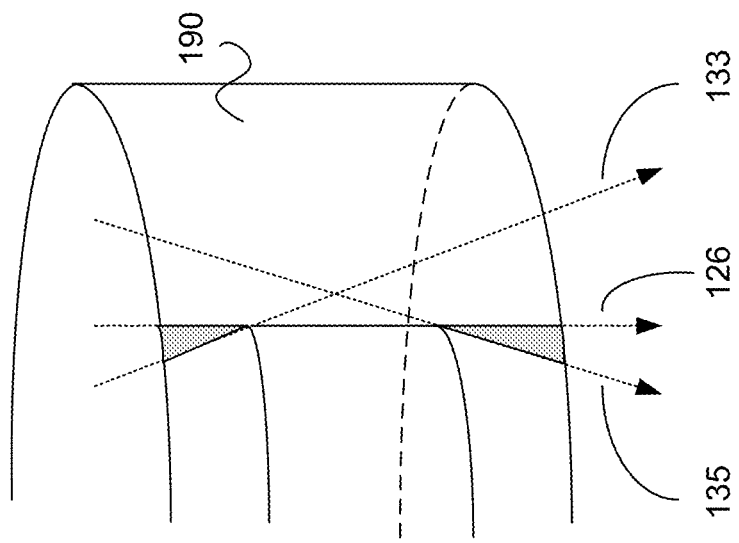

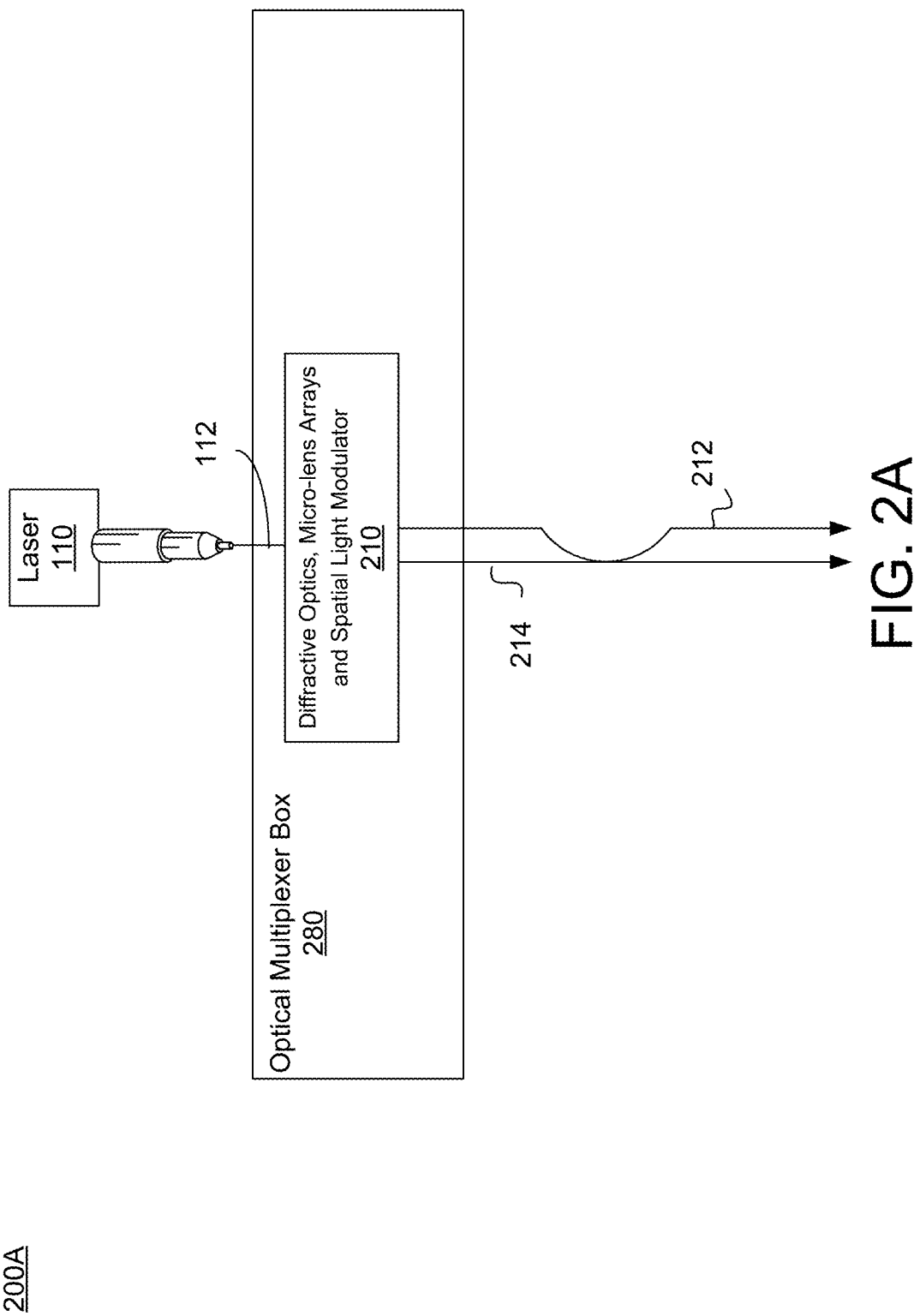

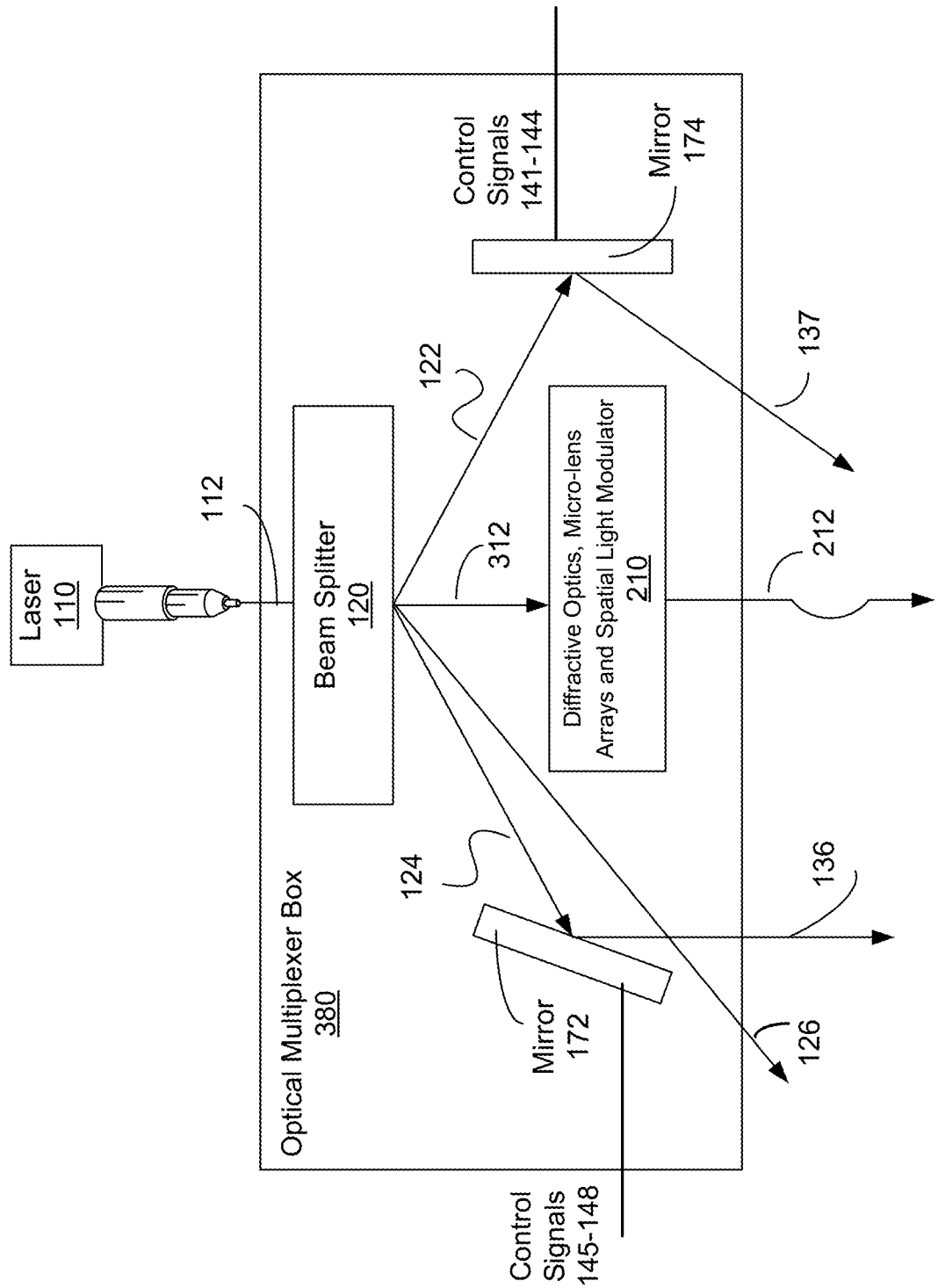

Projecting energy onto an annular edge of a glass substrate, wherein the annular edge includes a first roughness
1110

Reducing the first roughness to a second roughness with the energy, wherein the energy reduces the first roughness without changing a roundness of the annular edge of the glass substrate
1120

FIG. 11

Generating an energy column at an edge of a glass substrate, wherein the edge of the glass substrate includes a distribution of feature dimensions including higher feature dimensions and lower feature dimensions
1210

Rotating the edge of the glass substrate through the energy column
1220

Reflowing the edge of the glass substrate with the energy column, wherein the reflowing reduces the higher feature dimensions to the lower feature dimensions
1230

FIG. 12

Applying a first energy, a second energy, and a third energy to an annular edge of a glass substrate
1310

Increasing the smoothness of the annular edge of the glass substrate with the first energy, the second energy, and the third energy, wherein a roundness of the annular edge remains the same after the applying the first energy, the second energy, and the third energy, the annular edge of the glass substrate includes higher features and lower features, and increasing the smoothness of the annular edge reduces a number of the higher features to increase a number of the lower features
1320

FIG. 13

EDGE POLISHING A GLASS SUBSTRATE AFTER CUTTING

RELATED APPLICATIONS

This application claims the benefit and priority to the U.S. Provisional Patent Application No. 62/542,216, filed on Aug. 7, 2017, U.S. Provisional Patent Application No. 62/542,232, filed on Aug. 7, 2017, and U.S. Provisional Patent Application No. 62/542,235, filed on Aug. 7, 2017, which are incorporated by reference herein in their entirety.

SUMMARY

Provided herein is a method that includes projecting energy onto an annular edge of a glass substrate. The annular edge includes a first roughness. The first roughness is reduced to a second roughness with the energy. The energy reduces the first roughness without changing a roundness of the annular edge of the glass substrate.

These and other features and advantages will be apparent from a reading of the following detailed description.

BRIEF DESCRIPTION OF DRAWINGS

FIGS. 1A-1E show a system configured to cut and shape a glass substrate according to one aspect of the present embodiments.

FIGS. 2A-2B show a system including a Diffractive Optics, Micro-lens Arrays and Spatial Light Modulator (SLM) configured to cut and shape a glass substrate according to one aspect of the present embodiments.

FIGS. 3A-3F shows a system including an optical multiplexer box configured to cut and shape a glass substrate according to one aspect of the present embodiments.

FIG. 11 shows another flow diagram in accordance with one aspect of the present embodiments.

FIG. 12 shows an additional flow diagram in accordance with one aspect of the present embodiments.

FIG. 13 shows another additional flow diagram in accordance with one aspect of the present embodiments.

DESCRIPTION

Figure 1A:
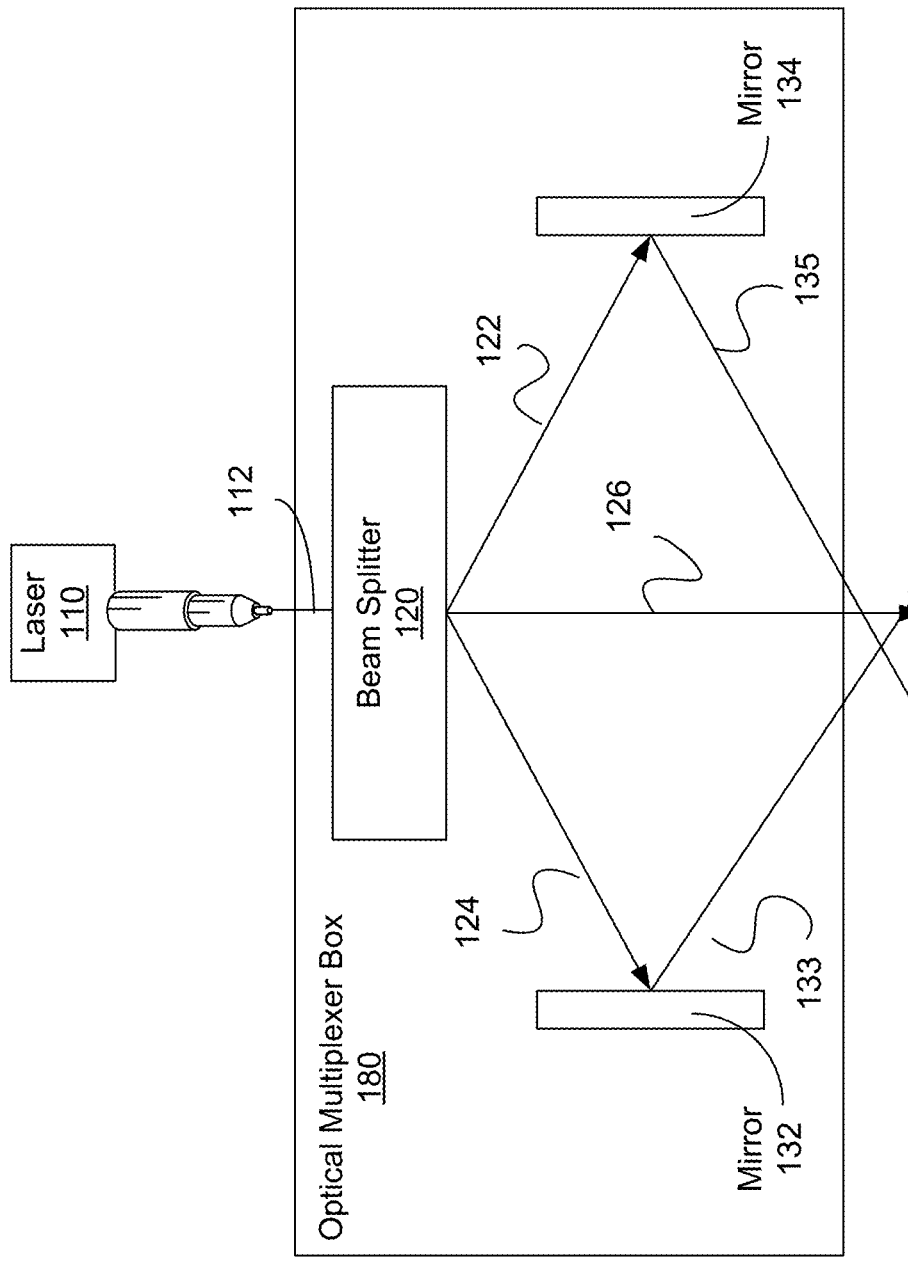

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

As the technology of magnetic recording media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. New technology such as Heat Assisted Magnetic Recording (HAMR) in disk drives has offered higher areal density as well as backward compatibility and enhanced data retention. A glass substrate has been used in HAMR technology consistent with thermal transfer properties of the HAMR writing process. Similarly, perpendicular media recording (PMR) technology in disk drive may benefit from using a glass substrate because a glass substrate has modulus and density similar to that of aluminum used in most cloud storage products.

Reducing the glass substrate thickness increases disk packing density, thereby increasing the drive capacity. In order to increase the drive capacity, the glass substrates used in HAMR and PMR have stringent surface roughness with tight dimensional precision. Unfortunately, the glass substrates are mechanically cut and grinded, causing fracturing and other surface anomalies. Moreover, mechanically cutting the glass substrate results in large dimensional errors, which require subsequent edging to bring the glass substrate within the final tolerances. Furthermore, subsequent grinding is not only costly but also time consuming, thereby adversely impacting the throughput.

Accordingly, a need has arisen to avoid mechanical cutting and grinding of the glass substrate in technologies with stringent surface roughness and tight dimensional precision such as PMR and HAMR. In some embodiments, an apparatus cuts and shapes the glass substrate in a non-mechanical fashion. In some embodiments, laser technology is used to simultaneously cut and shape a glass substrate. For example, the apparatus may include a beam splitter and a plurality of mirrors. The beam splitter is positioned to receive a laser beam from a source and split the received laser beam to a first plurality of split laser beams and a second plurality of split laser beams. The plurality of mirrors is configured to direct the first plurality of split laser beams and further configured to direct the second plurality of split laser beams. The first plurality of split laser beams directed by the plurality of mirrors is configured to cut a glass substrate. The second plurality of split laser beams directed by the plurality of mirrors is configured to shape the glass substrate. It is appreciated that the apparatus may further include a Diffractive Optics, Micro-lens Arrays and Spatial Light Modulator (SLM) configured to receive a laser beam from the source, or from the plurality of mirrors, or from the beam splitter. The Diffractive Optics, Micro-lens Arrays and Spatial Light Modulator (SLM) is configured to bend the received laser beam that shapes the glass substrate. It is appreciated that in some embodiments, the Diffractive Optics, Micro-lens Arrays and Spatial Light Modulator (SLM) is configured to cut the glass substrate.

Referring now to FIGS. 1A-1E, a system configured to cut and shape a glass substrate according to one aspect of the present embodiments is shown. More specifically, referring to FIG. 1A, a system 100A is shown. The system 100A includes a laser source 110 and an optical multiplexer box 180. The laser source 110 is configured to generate one or more laser beams, e.g., laser beam 112, that are received by the optical multiplexer box 180. The optical multiplexer box 180 is positioned to manipulate the received laser beam to generate a modified laser beam(s), e.g., laser beams 126, 133, and 135. The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to one or more of the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

In some embodiments, the optical multiplexer box 180 includes a beam splitter 120, and a plurality of mirrors, e.g., mirrors 132 and 134. The beam splitter 120 is positioned to receive the laser beam 112 from the laser source 110. The beam splitter 120 is configured to split the received laser beam 112 into more than one laser beam, e.g., laser beams 122, 124, and 126. It is appreciated that some of the split laser beams may be directed using the mirrors 132 and 134. For example, split laser beams 122 and 124 are emitted onto the mirrors 132 and 134 respectively at their respective incident angle. It is appreciated that the incident angles for the split laser beams 122 and 124 may or may not be the same. The mirrors 132 and 134 therefore reflect the split laser beams 122 and 124 at their respective angle of reflection, e.g., reflected laser beams 133 and 135. It is appreciated that some split laser beam(s) may not be directed using mirrors, e.g., split laser beam 126. It is appreciated that the positioning of the mirrors 132 and/or 134 may be fixed or it may be modifiable, e.g., one or more mirrors may be rotated to change the angle of incident and the angle of reflection.

The laser beams 126, 133 and 135 may be emitted from the optical multiplexer box 180 onto the glass substrate. As such, the glass substrate may be cut and shaped through means other than mechanical cutting and shaping. In some embodiments, the laser beams 126, 133, and 135 may cut and shape the glass substrate simultaneously.

It is appreciated that a component, e.g., diffractive optics, micro-lens arrays, spatial light modulator (SLM) for phase, wave front, and polarization control over the transverse direction of the laser, highly silvered mirrors on a linear piezo stage, pitch and yaw rotation stage, beam expander, beam compression, pulse stretching device, pulse shortening device, polarizing filter, polarizing rotator, photo-detector, beam shaping device (without shortening/stretching the pulse), fiber optic couplers, etc., may be positioned prior to or after the beam splitter 120 receiving the laser beam in order to modify the received laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. It is similarly appreciated that a component may be positioned prior to or after the mirrors 132 and/or 134 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc.

Referring now to FIG. 1B, a glass substrate 190 being cut/shaped is shown, as discussed in FIG. 1A. The modified laser beams, e.g., laser beams 126, 133, and/or 135, cut/shape the glass substrate 190 simultaneously in some embodiments. It is appreciated that in some embodiments, the cutting and shaping may occur sequentially but shortly after one another.

Figure 1C:
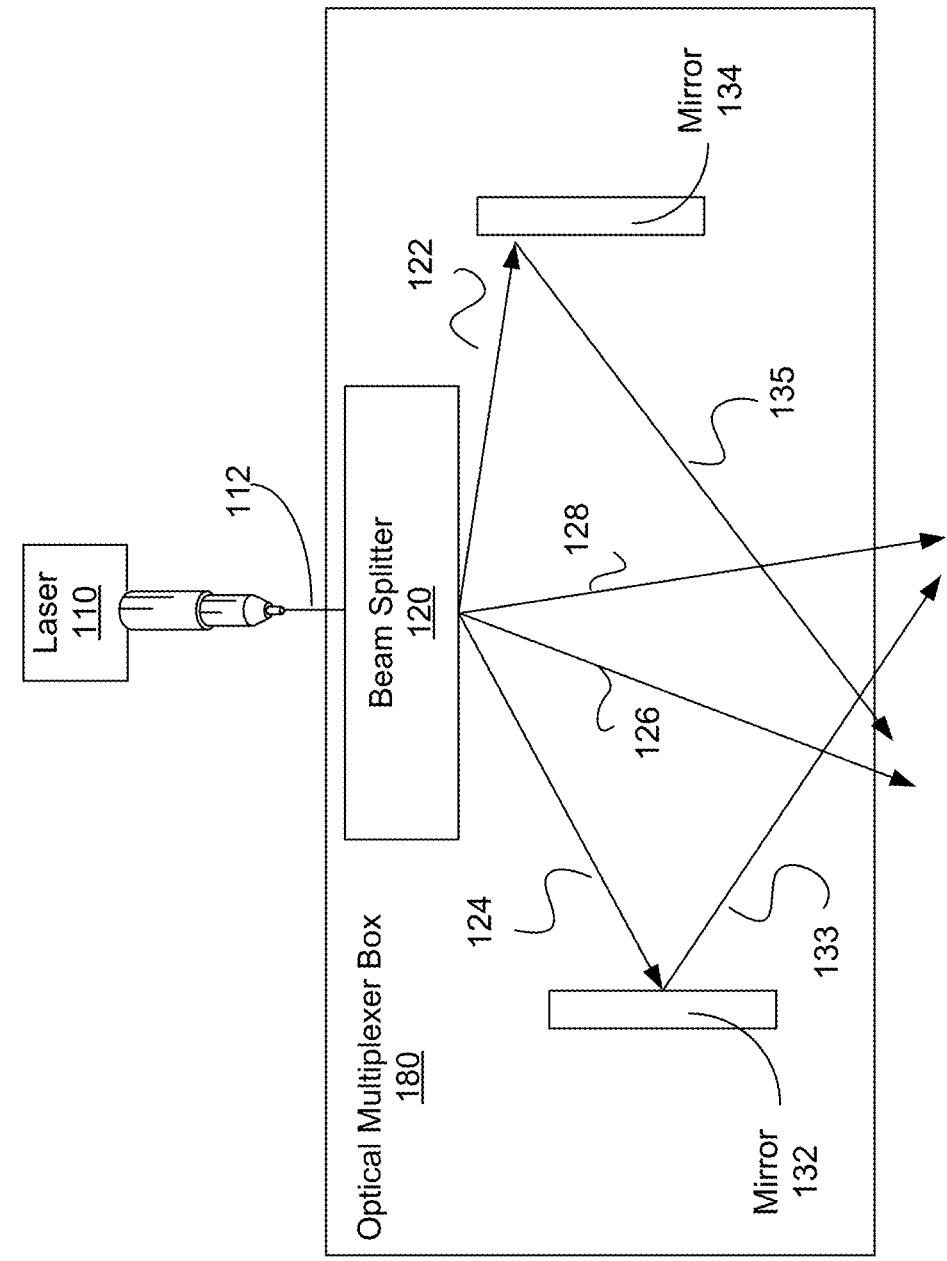

Referring now to FIG. 1C, a system 100C substantially similar to that of FIG. 1A is shown. In this embodiment, the beam splitter 120 split the received laser beams into four split laser beams, e.g., laser beams 122, 124, 126, and 128. Split laser beams 126 and 128 are emitted onto the glass substrate directly without being directed by a mirror.

Figure 1D:
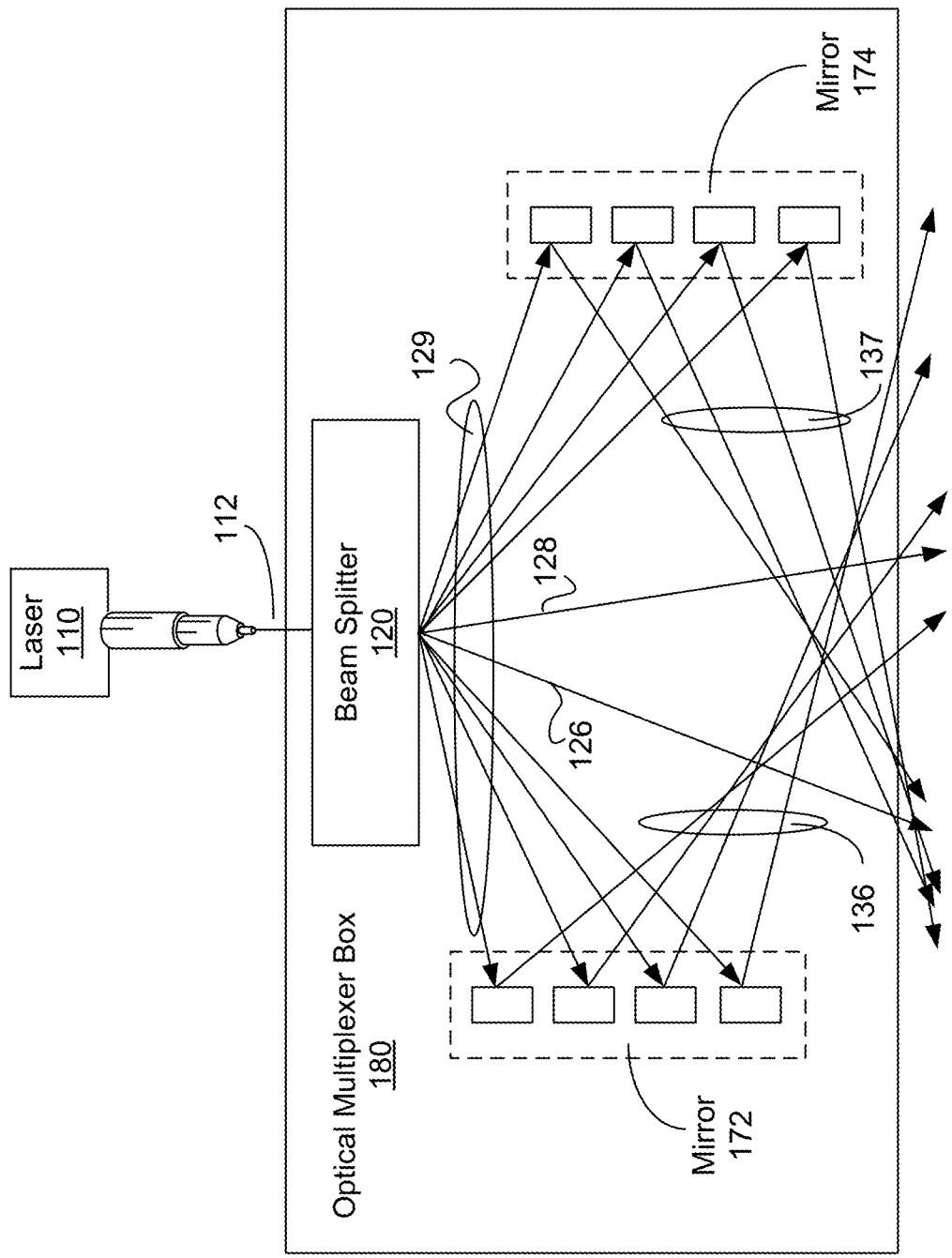

Referring now to FIG. 1D, a system 100D substantially similar to that of FIG. 1C is shown. In this embodiment, the beam splitter 120 splits the received laser beams into a plurality of split laser beams 129. Moreover, the mirror 134 is replaced with a mirror 174 that has a plurality of mirrors. Similarly, the mirror 132 is replaced with a mirror 172 that includes a plurality of mirrors. The mirror 172 receives a subset of the split laser beams and reflects a number of reflected split laser beams 136. Similarly, the mirror 174 receives a subset of the split laser beams and reflects a number of reflected split laser beams 137. Some of the split laser beams, e.g., 126 and 128, may be emitted from the beam splitter 120 without being directed by a mirror. The split laser beams either being emitted from the beam splitter 120 and/or reflected from the mirrors are emitted from the optical multiplexer box 180, thereby cutting and/or shaping the glass substrate.

Figure 1E:
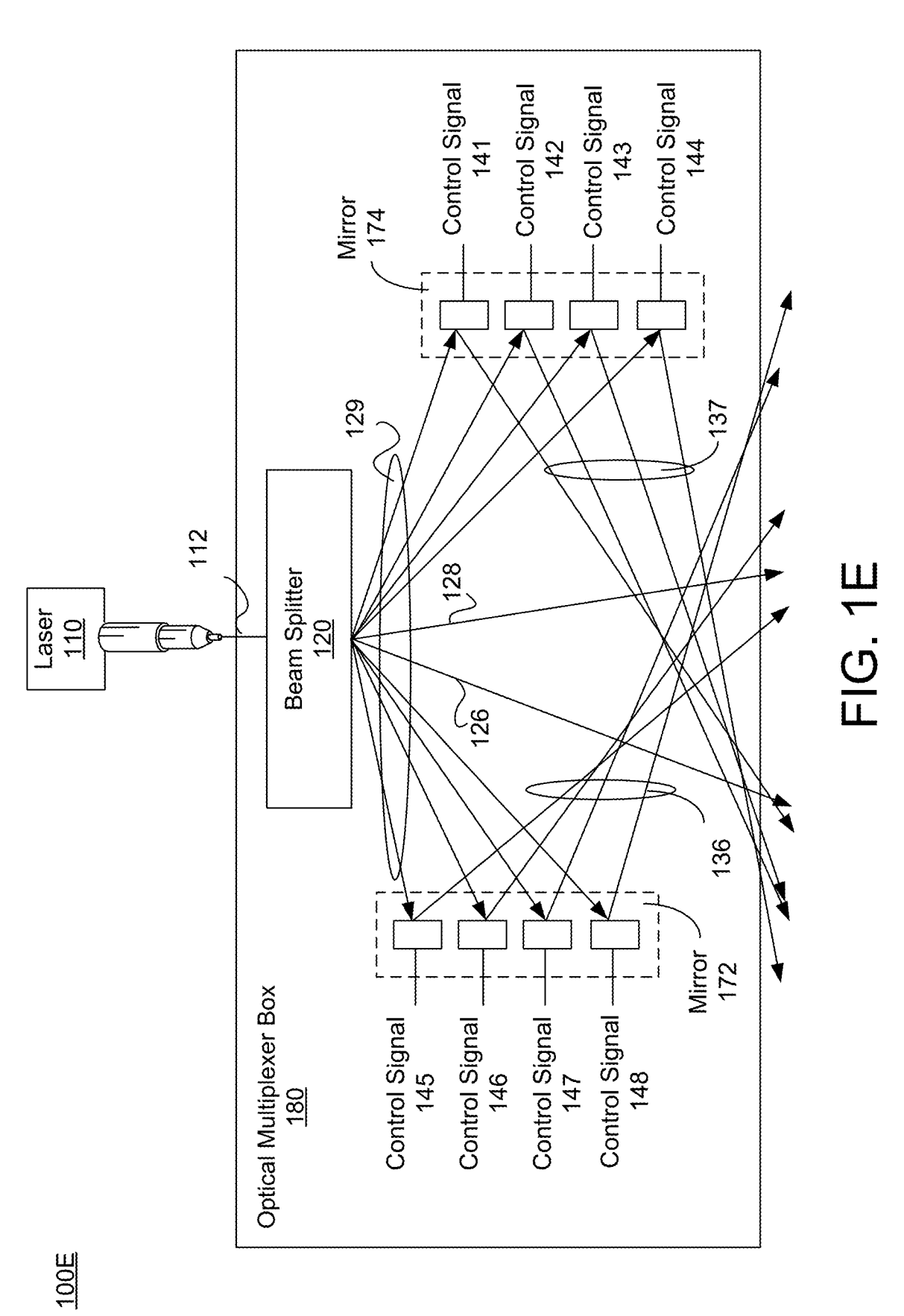

Referring now to FIG. 1E, a system 100E substantially similar to that of FIG. 1D is shown. In this embodiment, the mirrors 174 and 172 may be controlled using control signals 141-148. For example, the control signal 141 may control a mirror within the mirror 174 to move, therefore changing the angle of incident and as result changing the angle of reflection. Other mirrors may similarly be controlled. In some embodiments, the mirrors are controlled using the control signal using a microelectrical component, e.g., a microelectro mechanical device, piezo electric components, etc. to change their position in order to control the angle of incident and reflection.

Figure 2B:
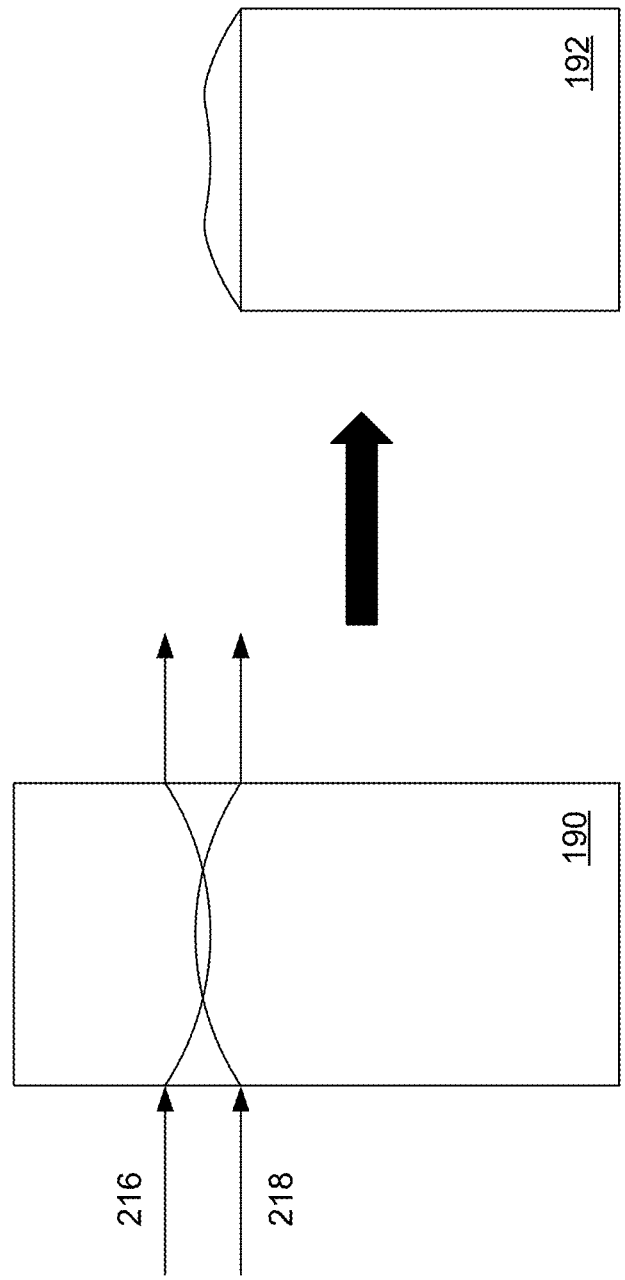

Referring now to FIGS. 2A-2B, a system including a Diffractive Optics, Micro-lens Arrays and Spatial Light Modulator (SLM) configured to cut and shape a glass substrate according to one aspect of the present embodiments is shown. FIG. 2A shows a system 200A. The system 200A includes a laser source 110 and an optical multiplexer box 280. The laser source 110 is configured to generate one or more laser beams, e.g., laser beam 112, that are received by the optical multiplexer box 280. The optical multiplexer box 280 is positioned to manipulate the received laser beam to generate a modified laser beam(s). The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

In some embodiments, the optical multiplexer box 280 includes a Diffractive Optics, Micro-lens Arrays and Spatial Light Modulator (SLM) 210. The Diffractive Optics, Micro-lens Arrays and Spatial Light Modulator (SLM) 210 may bend the received laser beam 112, e.g., laser beam 212. It is appreciated that in some embodiments, the Diffractive Optics, Micro-lens Arrays and Spatial Light Modulator (SLM) 210 may be configured to transmit the received laser beam 112 without bending it, e.g., laser beam 214. The laser beams 212 and 214 output from the optical multiplexer box 280 may cut and/or shape the substrate glass. It is appreciated that in some embodiments, the laser beams 212 and 214 may cut and shape the substrate glass simultaneously. In some embodiments, the Diffractive Optics, Micro-lens Arrays and Spatial Light Modulator (SLM) 210 may include a Gaussian diffractive optics, a Bessel diffractive optics, an Airy diffractive optics, or any combination thereof.

Referring now to FIG. 2B, the glass substrate 190 may be cut using two bended laser beams 216 and 218. The glass substrate 190 once cut and shaped is shown as the glass substrate 192.

Figure 3A:
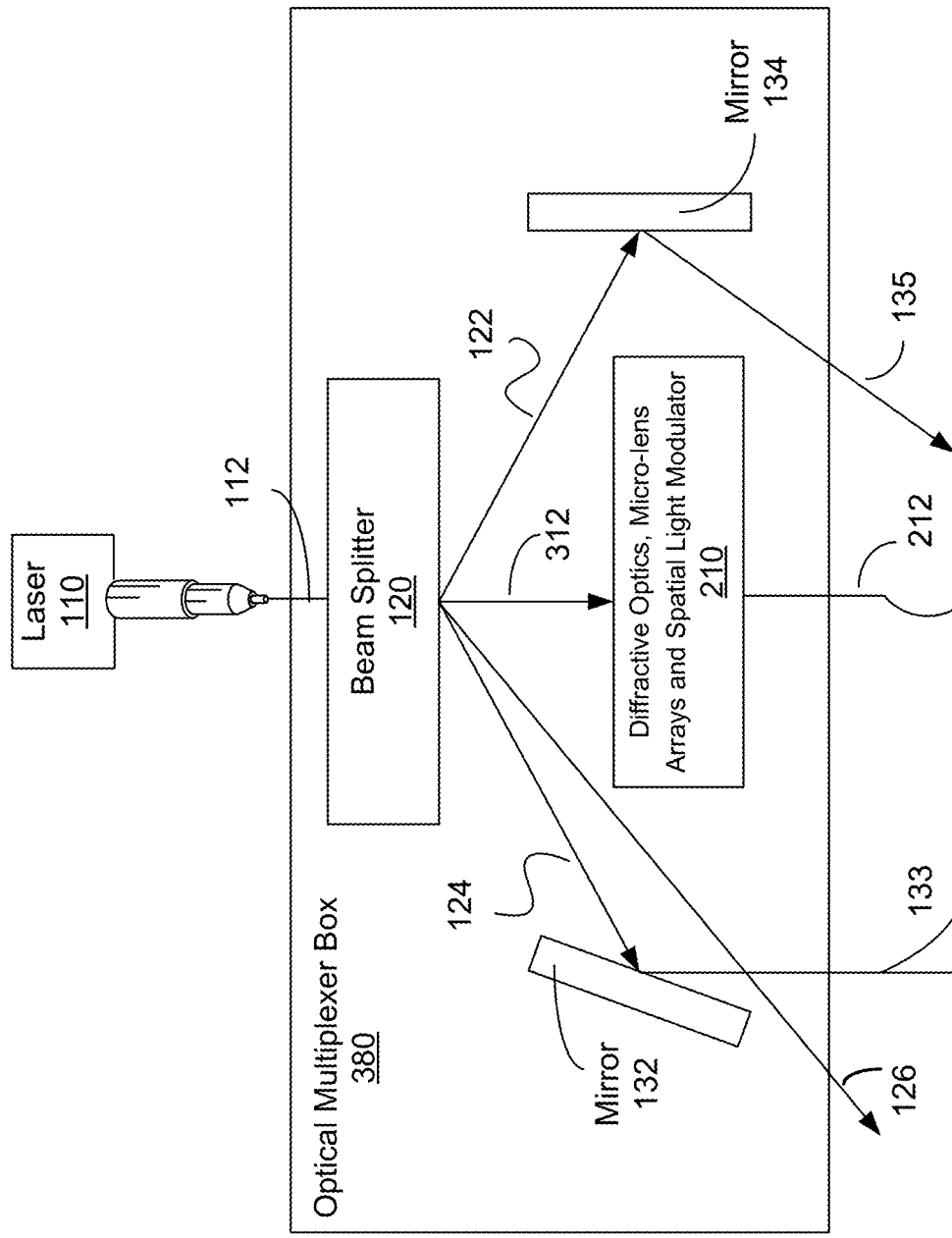

Referring now to FIGS. 3A-3F, a system including an optical multiplexer box configured to cut and shape a glass substrate according to one aspect of the present embodiments is shown. Referring more specifically to FIG. 3A, a combination of FIGS. 1A and 2A is shown. System 300A includes a laser source 110 and an optical multiplexer box 380. The laser source 110 is configured to generate one or more laser beams, e.g., laser beam 112, that are received by the optical multiplexer box 380. The optical multiplexer box 380 is positioned to manipulate the received laser beam(s) to generate a modified laser beam(s), e.g., laser beams 126, 133, 212, and 135. The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

The optical multiplexer box 380 includes a beam splitter 120, a Diffractive Optics, Micro-lens Arrays and Spatial Light Modulator (SLM) 210, and a plurality of mirrors, e.g., mirrors 132 and 134. The beam splitter 120 is positioned to receive the laser beam 112 from the laser source 110. The beam splitter 120 is configured to split the received laser beam 112 into more than one laser beam, e.g., laser beams 122, 124, 126, and 312. It is appreciated that some of the split laser beams may be directed using the mirrors 132 and 134. For example, split laser beams 122 and 124 are emitted onto the mirrors 132 and 134 respectively at their respective incident angle. It is appreciated that the incident angles for the split laser beams 122 and 124 may or may not be the same. The mirrors 132 and 134 therefore reflect the split laser beams 122 and 124 at their respective angle of reflection, e.g., reflected laser beams 133 and 135. It is appreciated that some split laser beam(s) may not be directed using mirrors, e.g., split laser beam 126. It is appreciated that the positioning of the mirrors 132 and/or 134 may be fixed or it may be modifiable, e.g., one or more mirrors may be rotated to change the angle of incident and the angle of reflection.

The split laser beam 312 is emitted from the beam splitter 120 to the Diffractive Optics, Micro-lens Arrays and Spatial Light Modulator (SLM) 210. The diffractive optics array 210 may bend the received split laser beam 312 to generate a bent laser beam 212.

The laser beams 126, 133, 135, and 212 may be emitted from the optical multiplexer box 380 onto the glass substrate. As such, the glass substrate may be cut and shaped through means other than mechanical cutting and shaping. In some embodiments, the laser beams 126, 133, 135, and 212 may cut and shape the glass substrate simultaneously.

It is appreciated that a component, e.g., diffractive optics, micro-lens arrays, spatial light modulator (SLM) for phase, wave front, and polarization control over the transverse direction of the laser, highly silvered mirrors on a linear piezo stage, pitch and yaw rotation stage, beam expander, beam compression, pulse stretching device, pulse shortening device, polarizing filter, polarizing rotator, photo-detector, beam shaping device (without shortening/stretching the pulse), fiber optic couplers, etc., may be positioned prior to or after the beam splitter 120 receiving the laser beam in order to modify the received laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. It is similarly appreciated that a component may be positioned prior to or after the mirrors 132 and/or 134 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. Moreover, it is appreciated that a component may be positioned prior to or after the Diffractive Optics, Micro-lens Arrays and Spatial Light Modulator (SLM) 210 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc.

Figure 3B:
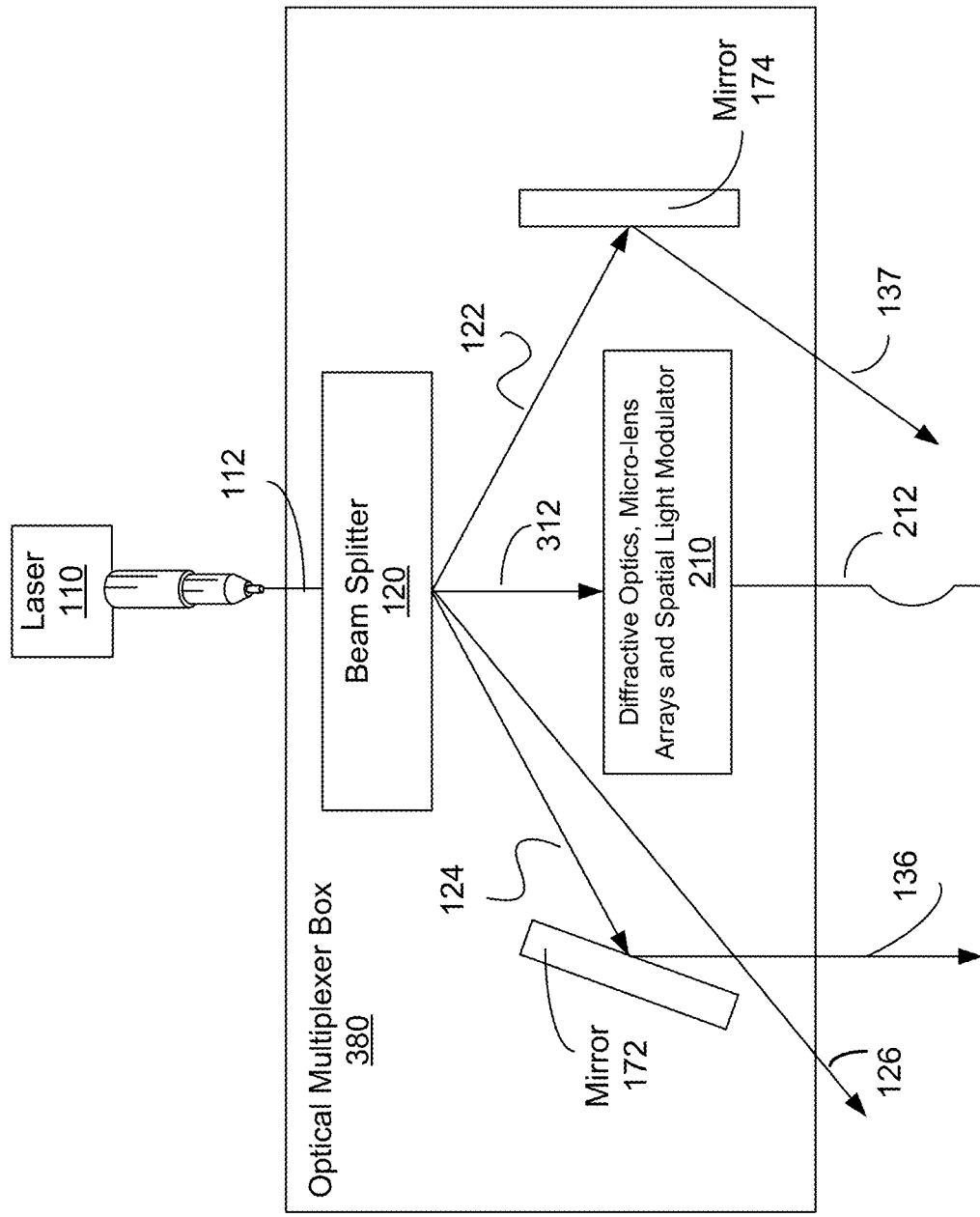

Referring now to FIG. 3B, system 300B is shown that operates substantially similar to that of FIG. 3A. In this embodiment, the mirrors 132 and 134 are replaced with a plurality of mirrors 172 and 174, similar to system 100D discussed in FIG. 1D.

Referring now to FIG. 3C, system 300C is shown that operates substantially similar to that of FIG. 3B. In this embodiment, the mirrors 174 and 172 may be controlled using the control signals 141-148, similar to system 100E discussed in FIG. 1E.

Figure 3D:
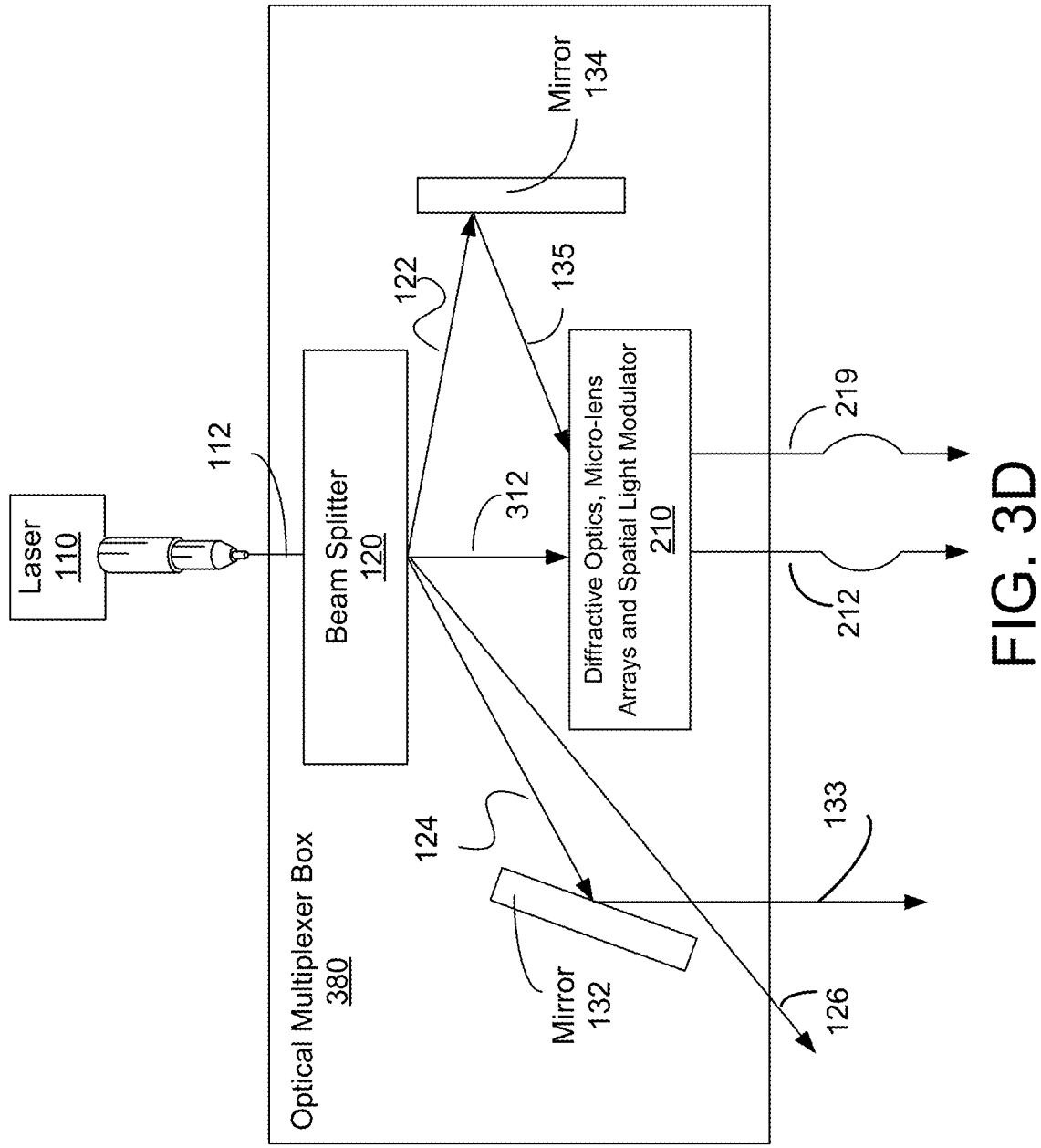

Referring now to FIG. 3D, system 300D is shown that operates substantially similar to that of FIG. 3A. In this embodiment, the mirror 134 emits the reflected laser beam 135 to the Diffractive Optics, Micro-lens Arrays and Spatial Light Modulator (SLM) 210 instead of emitting it onto the glass substrate. Thus, the reflected laser beam 135 may be bent using the Diffractive Optics, Micro-lens Arrays and Spatial Light Modulator (SLM) 210. The Diffractive Optics, Micro-lens Arrays and Spatial Light Modulator (SLM) 210 may bend the reflected laser beam 135 and output the bent laser beam 219 onto the glass substrate. Thus, the optical multiplexer box 380 may output laser beams 126, 133, 212, and 219 to cut and/or shape the glass substrate. In some embodiments, the optical multiplexer box 380 may output laser beams 126, 133, 212, and 219 to cut and shape the glass substrate simultaneously.

Figure 3E:
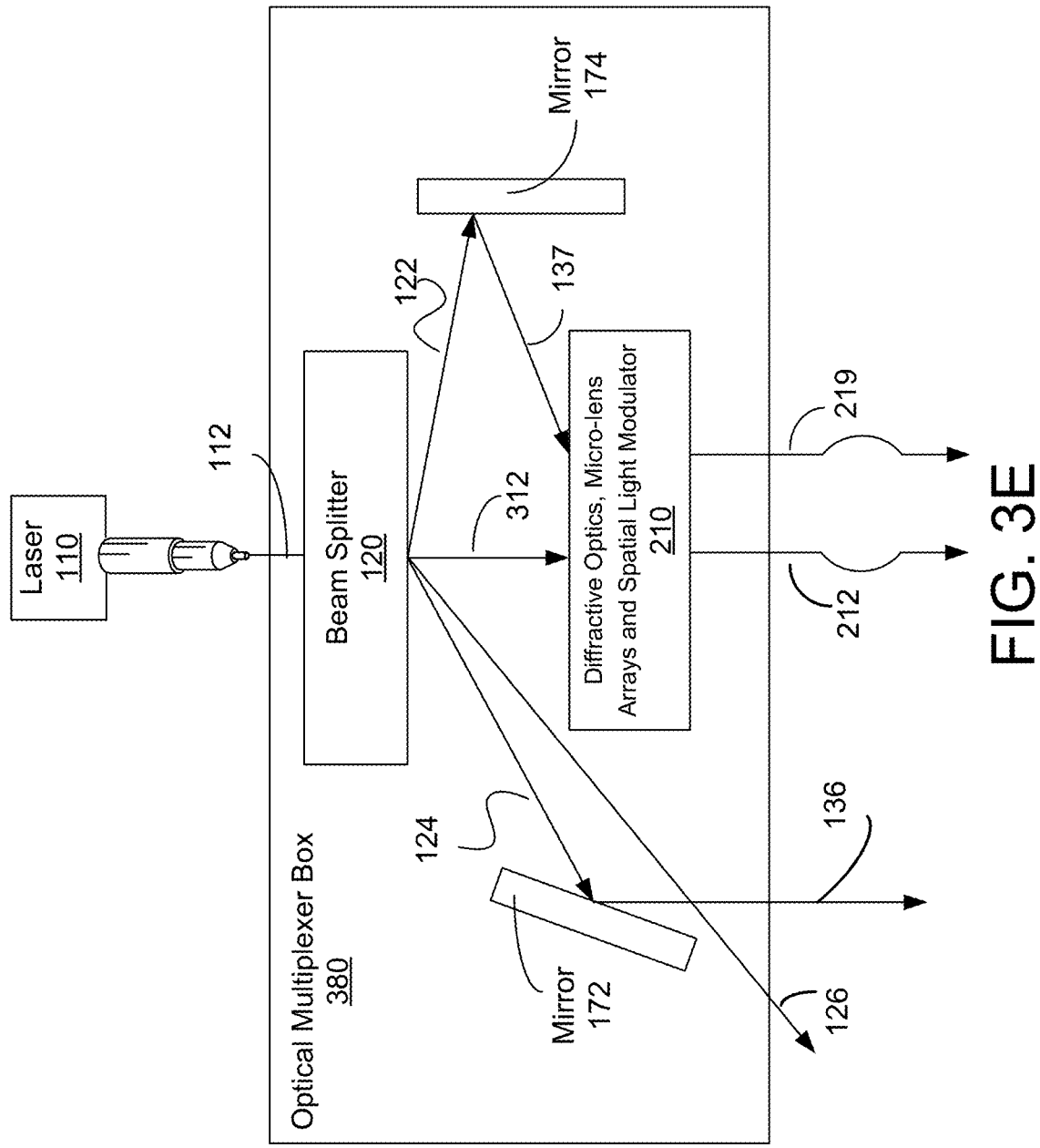

Referring now to FIG. 3E, system 300E is shown that operates substantially similar to that of FIG. 3D. In this embodiment, the mirrors 132 and 134 are replaced with mirrors 172 and 174 where each may include a plurality of mirrors, as discussed in system 100D discussed in FIG. 1D.

Figure 3F:
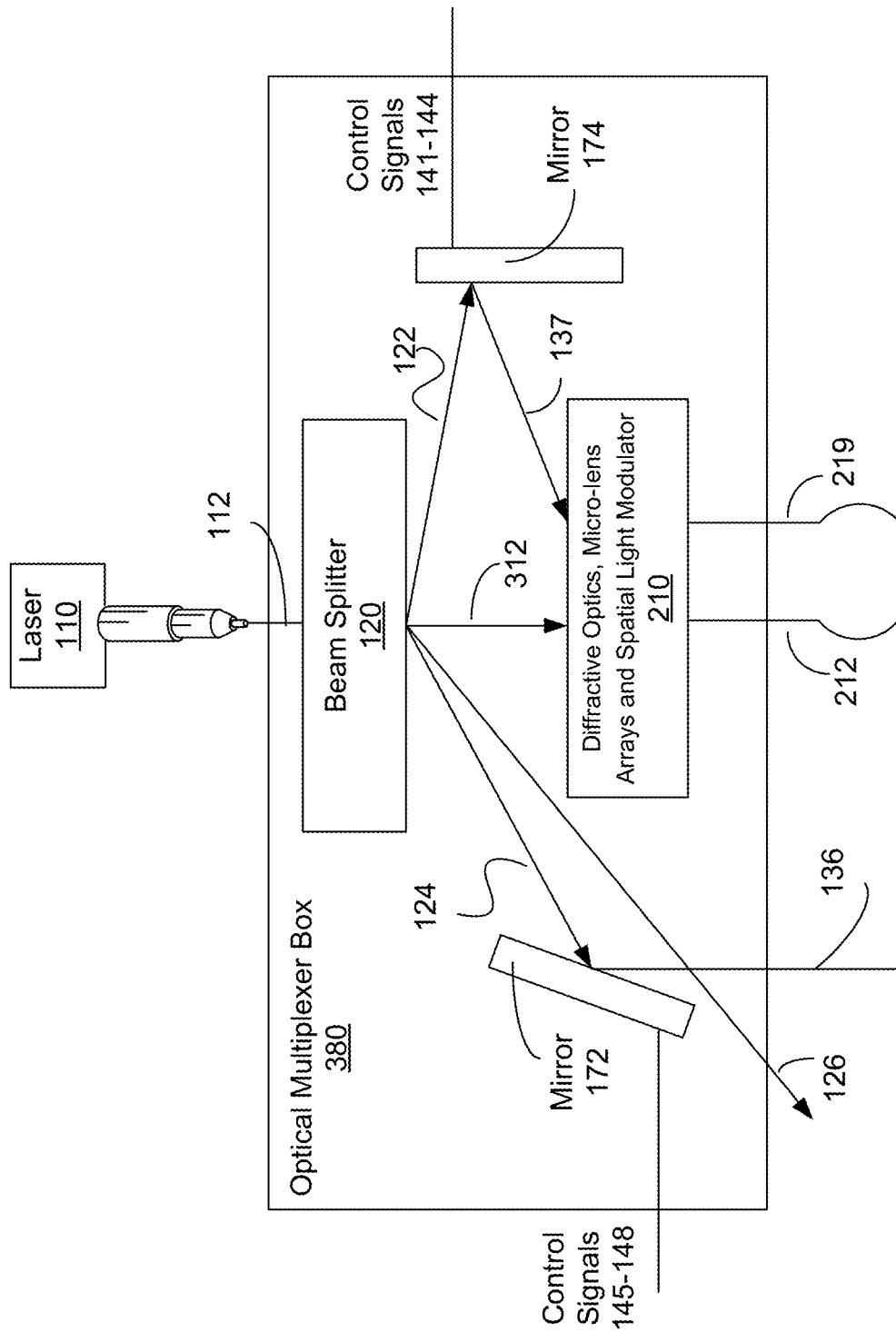

Referring now to FIG. 3F, system 300F is shown that operates substantially similar to that of FIG. 3E. In this embodiment, the mirrors 172 and 174 may be controlled using the control signals 141-148, similar to system 100E discussed in FIG. 1E.

Figure 4:
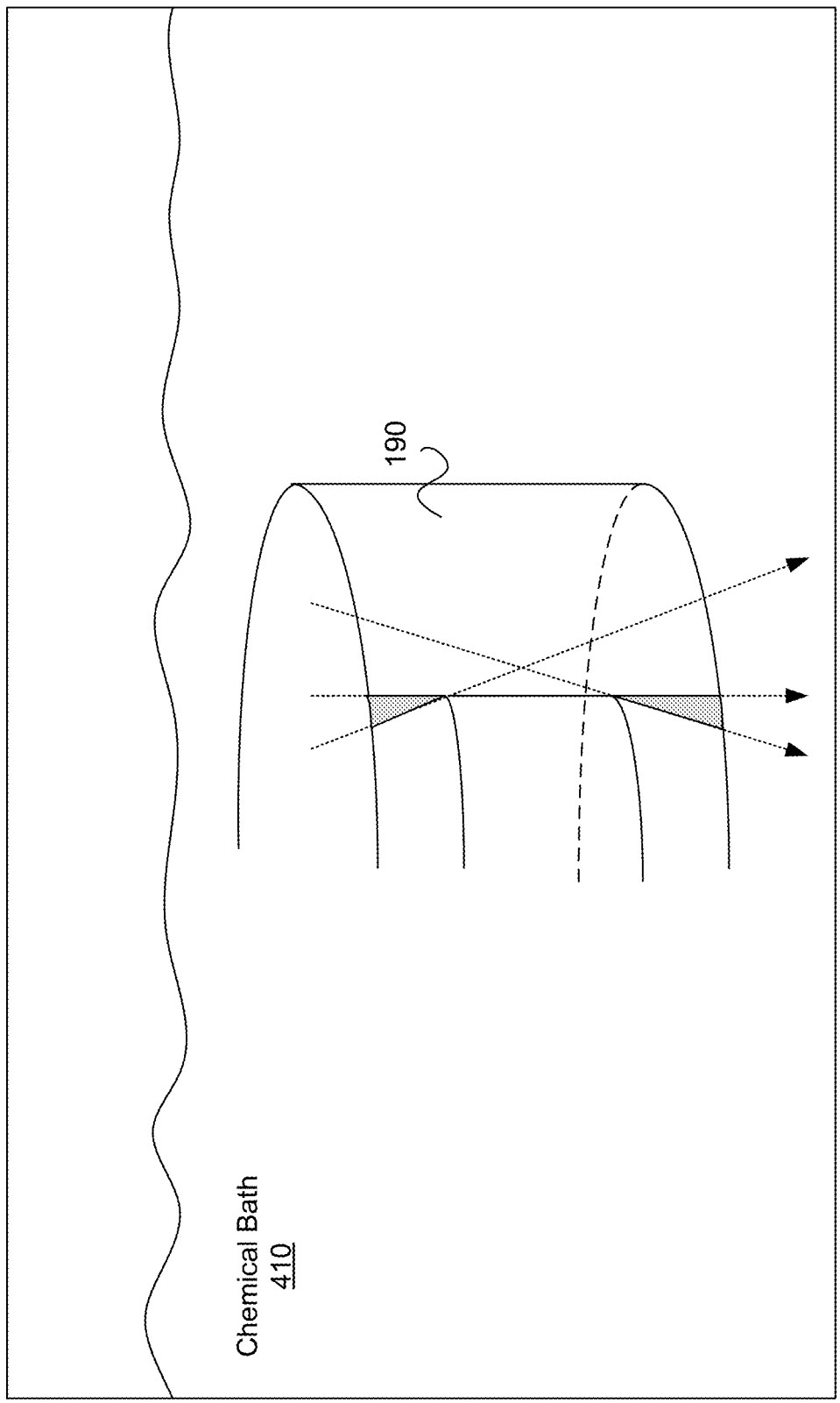
FIG. 4 shows a system including an optical multiplexer box configured to chemically alter a glass substrate into a shape defined by the chemical alteration according to one aspect of the present embodiments.

Referring now to FIG. 4, a system including an optical multiplexer box configured to chemically alter a glass substrate into a shape defined by the chemical alteration according to one aspect of the present embodiments is shown. It is appreciated that a system including an optical multiplexer box, as discussed with respect to FIGS. 1A-3F, may be used to chemically alter the glass substrate into a shape defined by the chemical alteration rather than cut the glass substrate. In other words, the output of the optical multiplexer box may focus the emitted laser beams onto the glass substrate 190 in order to alter the chemical properties of the glass substrate where the laser beam is focused. The chemical alteration delineates a desired cut/shape within the transparent glass substrate. Once the glass substrate 190 is placed in a chemical bath 410, e.g., Potassium Hydroxide (KOH) ~1 um/s with selectivity of 350, Sodium Hydroxide (NaOH), Hydrofluoric acid (HF) ~1 um/s with selectivity of 100, etc., the glass substrate 190 separates according to the shape defined by the chemical alteration. For example, in the embodiment shown in FIG. 4, the glass substrate 190 separates at positioned on the glass substrate 190 where the laser beam was focused. Thus, the glass substrate may be formed and shaped without using mechanical cutting and grinding.

Figure 5:
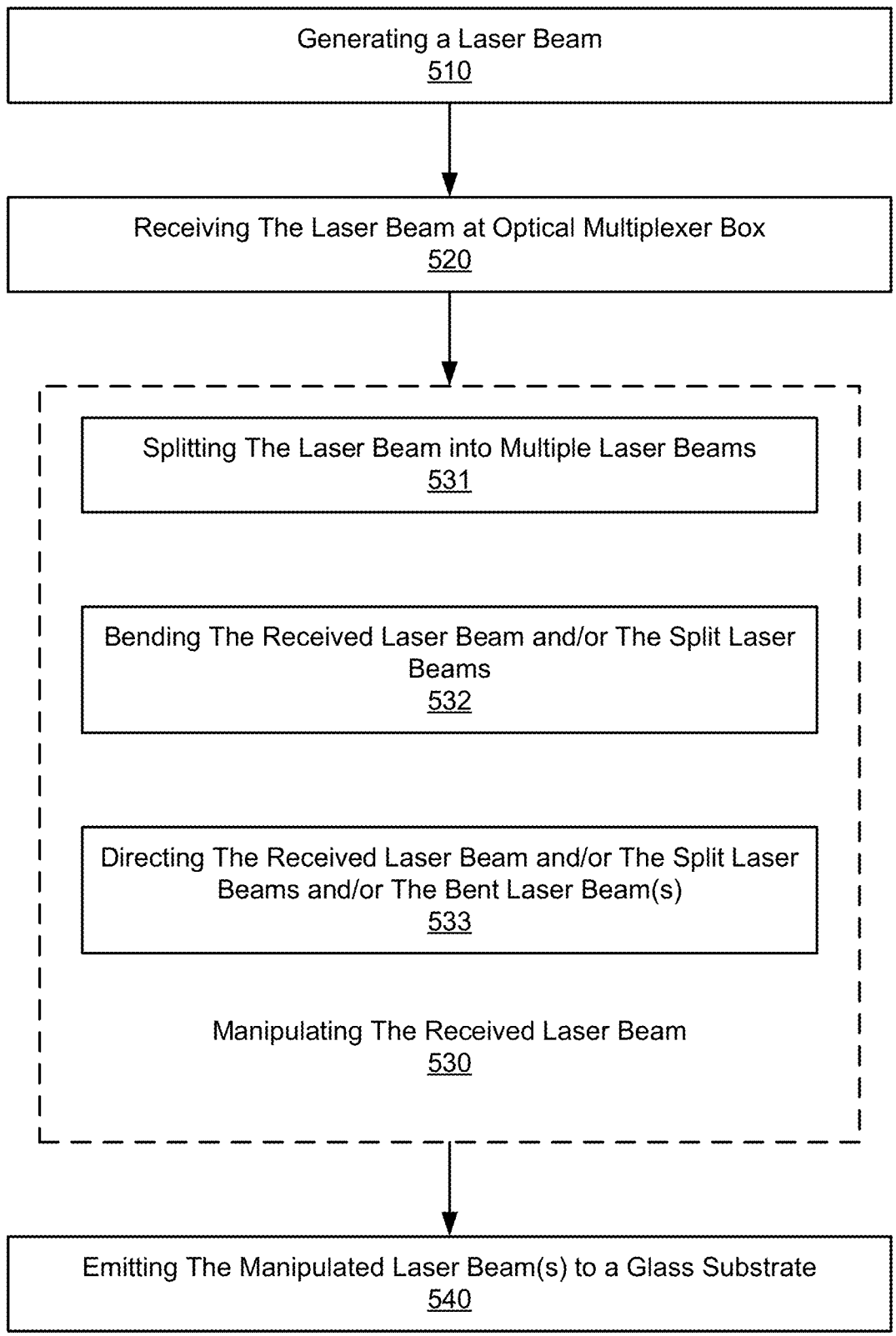
FIG. 5 shows an exemplary flow diagram in accordance with one aspect of the present embodiments.

Referring now to FIG. 5, a flow diagram in accordance with one aspect of the present embodiments is shown. At step 510, a laser beam is generated, e.g., by a laser source. At step 520, the generated laser beam is received by the optical multiplexer box 520, e.g., as described in FIGS. 1A-4. The optical multiplexer box 520 may manipulate the received laser beam, in step 530, as described in FIGS. 1A-4. For example, at step 531, the laser beam may be split into multiple laser beams, e.g., using a beam splitter. At step 532, the received laser beam or one or more of the split laser beams may be bent, e.g., using Diffractive Optics, Micro-lens Arrays and Spatial Light Modulator (SLM). In some embodiments, at step 533, the received laser beam and/or the split laser beam(s) and/or the bent laser beam(s) may be directed, e.g., using one or mirrors. It is appreciated that the mirrors may be controlled using one or more control signals, as described above. At step 540, the manipulated laser beam(s) is emitted from the optical multiplexer box 520 onto a glass substrate. As such, the glass substrate may be cut and shaped without using mechanical cutting and grinding. Moreover, the glass substrate may be cut and shaped simultaneously. Furthermore, it is appreciated that in some embodiments, the optical multiplexer box may chemically alter the glass substrate into a shape defined by the chemical alteration rather than cut the glass substrate. In other words, the output of the optical multiplexer box may focus the emitted laser beams onto the glass substrate in order to alter the chemical properties of the glass substrate where the laser beam is focused. The chemical alteration delineates a desired cut/shape within the transparent glass substrate. Once the glass substrate is placed in a chemical bath, e.g., Aqueous solutions of Potassium Hydroxide (KOH) (concentrations of 5-20 mol/(dm)3, Sodium Hydroxide (NaOH) (concentrations of 5-20 mol/(dm)3), Hydrofluoric acid (HF) (concentrations of 1-10%), Muriatic acid (HCL) (concentrations of 10-80%). Bath times (5 min-100 min) and etch rates (1 um/min up to 20 um/min) can be adjusted by varying the chemical bath concentrations, bath temperature (between 20 and 90 degree Celsius), etc., the glass substrate 190 separates according to the shape defined by the chemical alteration. Further enhancement of etch rates can be achieved by applying ultrasonic or megasonic waves to the chemical bath. Thus, the glass substrate may be formed and shaped without using mechanical cutting and grinding.

Figure 6A:
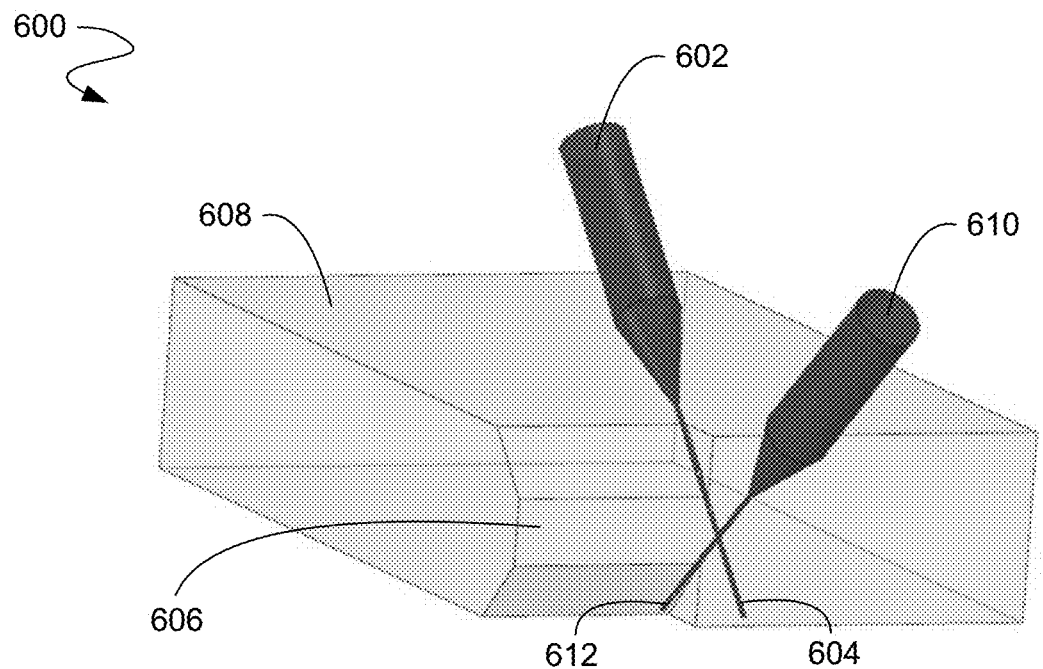
FIGS. 6A, 6B, and 6C show a system for shaping an exposed edge of a previously cut glass substrate according to one aspect of the present embodiments.
Figure 6B:
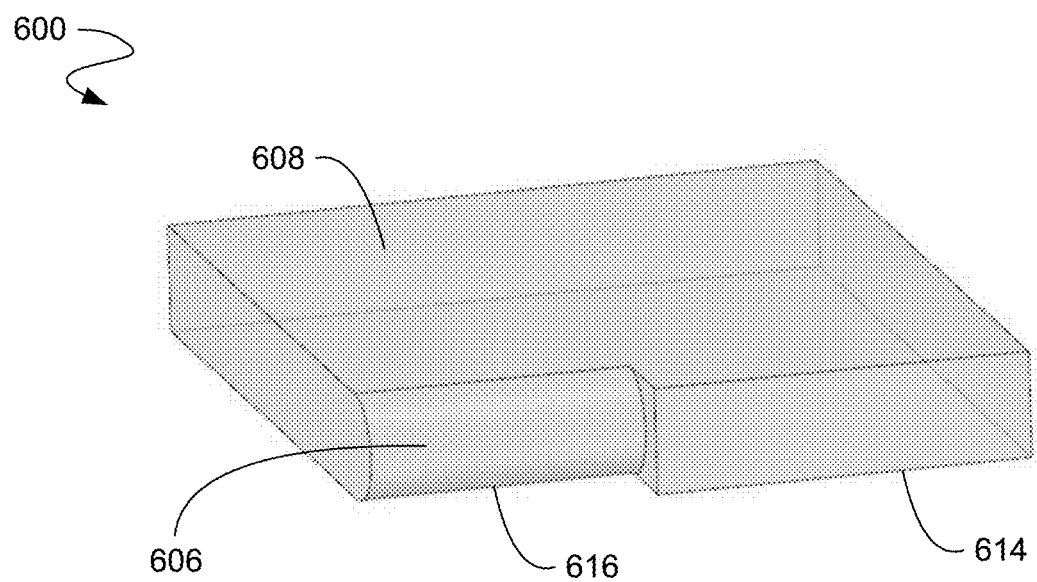
Figure 6C:
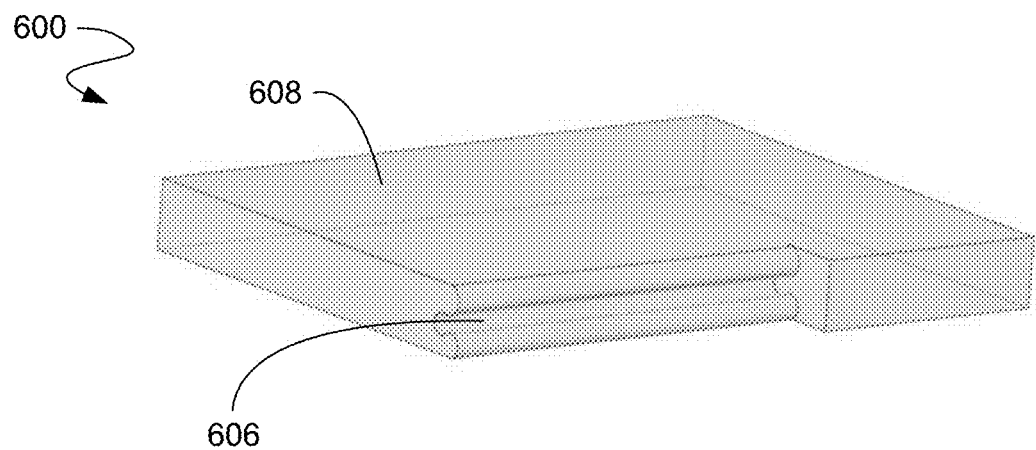

Referring now to FIGS. 6A, 6B, and 6C, a system 600 for shaping an exposed edge of a previously cut glass substrate is shown according to one aspect of the present embodiments. An energy source 602 is positioned to create an energy beam 604 (e.g. laser, plasma, etc.) along an exposed edge 606 of a glass substrate 608. The energy beam 604 shapes the exposed edge 606 of the glass substrate 608 by removing portions of the exposed edge 606 of the glass substrate 608. In various embodiments, the glass substrate 608 may have been previously cut (e.g. by mechanical, laser, chemical, etc.) into an annular shape (e.g. a disc), thereby forming the exposed edge 606. As such, the exposed edge 606 extends annularly around the glass substrate 608. It is understood that the energy beam 604 may also be referred to as an energy column.

In some embodiments, a number of energy sources may be used to shape the exposed edge 606. For example, an additional energy source 610 may also be positioned to create an additional energy beam 612 along the exposed edge 606 of the glass substrate 608. The additional energy beam 612 further shapes the exposed edge 606 of the glass substrate 608 by removing additional portions of the exposed edge 606 of the glass substrate 608. In further embodiments, any number of energy sources and energy beams may be used. In various embodiments, one or more of the energy sources may be stationary and the glass substrate 608 may be rotatable. As such, the glass substrate 608 may rotate through the energy beams, thereby rotating the exposed edge 606 through the energy beams.

As previously described, a beam splitter may be positioned to create a number of energy beams from an energy source. For example, a beam splitter may be positioned between the energy source 602 and the substrate 608. The energy source 602 may project an incoming energy beam into the beam splitter. The beam splitter may then split the incoming energy beam into a first energy beam (e.g. energy beam 604) and a second energy beam (e.g. additional energy beam 612). It is understood that if a beam splitter is used to create the additional energy beam 612, the additional energy source 610 will not be needed. Also as previously described, one or more mirrors may be positioned to direct one or more of the energy beams along the exposed edge 606 of the glass substrate 608.

FIG. 6B illustrates a smooth and rounded exposed edge 606. As previously described, a number of energy beams may be directed along the exposed edge 606 of the glass substrate 608. As the number of energy beams directed along the exposed edge 606 at different angles increases, the roundness of the exposed edge 606 may also increase. For example, after the glass substrate 608 has been cut into the annular shape, the exposed edge 606 may be very angular (e.g. not round and pointed with corners), as illustrated by angular portion 614. As the exposed edge 606 is shaped by one or more energy beams the roundness increases, as illustrated by rounded portion 616.

In further embodiments, the energy beams may be moved by one or more mirrors (as previously described) in order to increase the roundness of the exposed edge 606. In additional embodiments, one or more Diffractive Optics, Microlens Arrays and Spatial Light Modulator (SLM) (as previously described) may be positioned to bend one or more energy beams to shape the exposed edge 606 of the glass substrate 608. As previously described, the glass substrate 608 may rotate through the bent portion of the one or more energy beams, thereby directing the removal of portions of the glass substrate 608 along the exposed edge 606.

FIG. 6C illustrates a complex shaped exposed edge 606. As previously described, energy beams may be used to create any number of shapes (both simple and complex) in the exposed edge 606 of the glass substrate 608. In various embodiments, the exposed edge 606 may be shaped by any combination of linear energy beam(s) and/or bent energy beam(s). In further embodiments, the exposed edge 606 may include a uniform shape around the circumference of the glass substrate 608, or the exposed edge 606 may include a non-uniform shape around the circumference of the glass substrate 608.

Figure 7A:
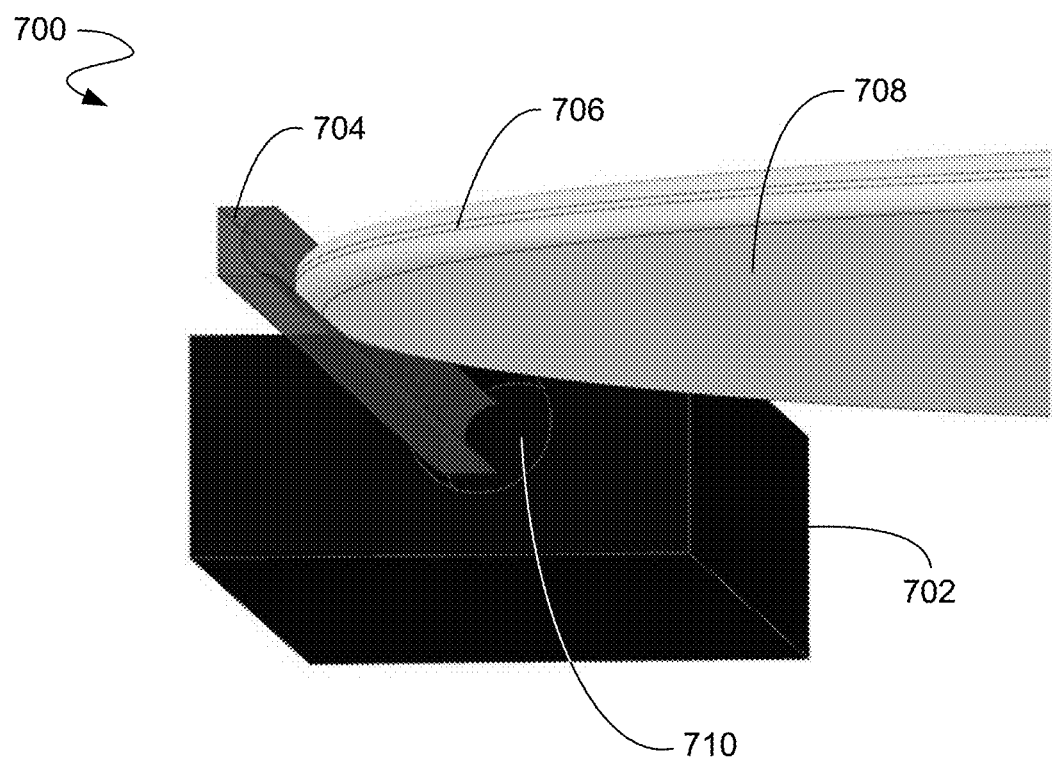
FIGS. 7A and 7B show a system for shaping an exposed edge with an energy source that is tangential to the exposed edge according to one aspect of the present embodiments.
Figure 7B:
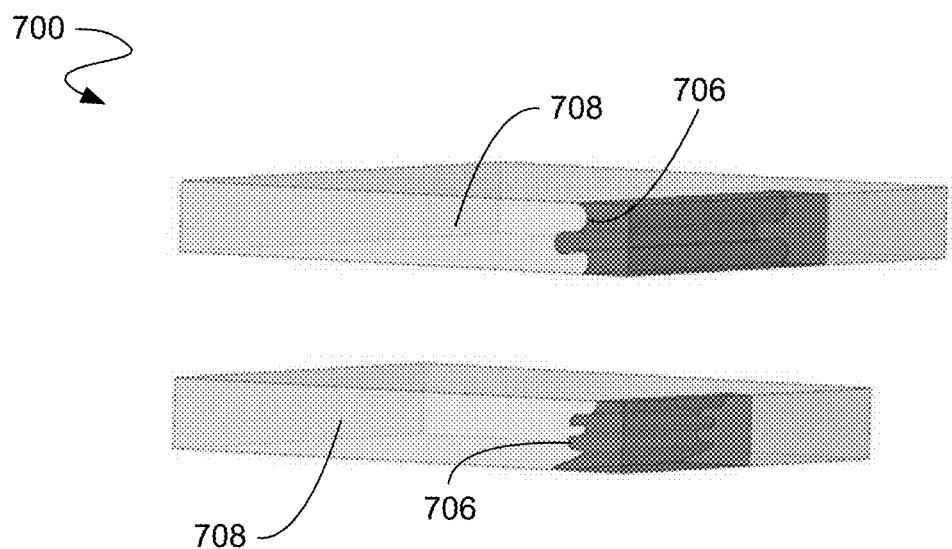

Referring to FIGS. 7A and 7B, a system 700 is shown for shaping an exposed edge with an energy source that is tangential to the exposed edge according to one aspect of the present embodiments. An energy source 702 is positioned to create an energy beam 704 (e.g. laser, plasma, etc.) along an exposed edge 706 of a glass substrate 708. The energy beam 704 is tangential to the exposed edge 706 of the glass substrate 708. In various embodiments, the energy source 702 may also be positioned tangential to the exposed edge 706 of the glass substrate 708. In further embodiments, the energy source 702 may be positioned anywhere and the energy beam 704 may be directed tangentially to the exposed edge 706 through the use of various components described above (e.g. mirror, beam splitter, special diffractive optics array, etc.).

As previously discussed, the energy beam 704 shapes the exposed edge 706 of the glass substrate 708 by removing portions of the exposed edge 706 of the glass substrate 708. In various embodiments, the energy source 702 may include a mask feature 710 to shape a profile of the energy beam 704. As such the energy beam 704 may be shaped to create any shape in the exposed edge 706. For example, in some embodiments the energy beam 704 may form a simple rounded edge, as illustrated in FIG. 7A. In further embodiments, the energy beam 704 may form more complex shapes, as illustrated in FIG. 7B.

Figure 8:
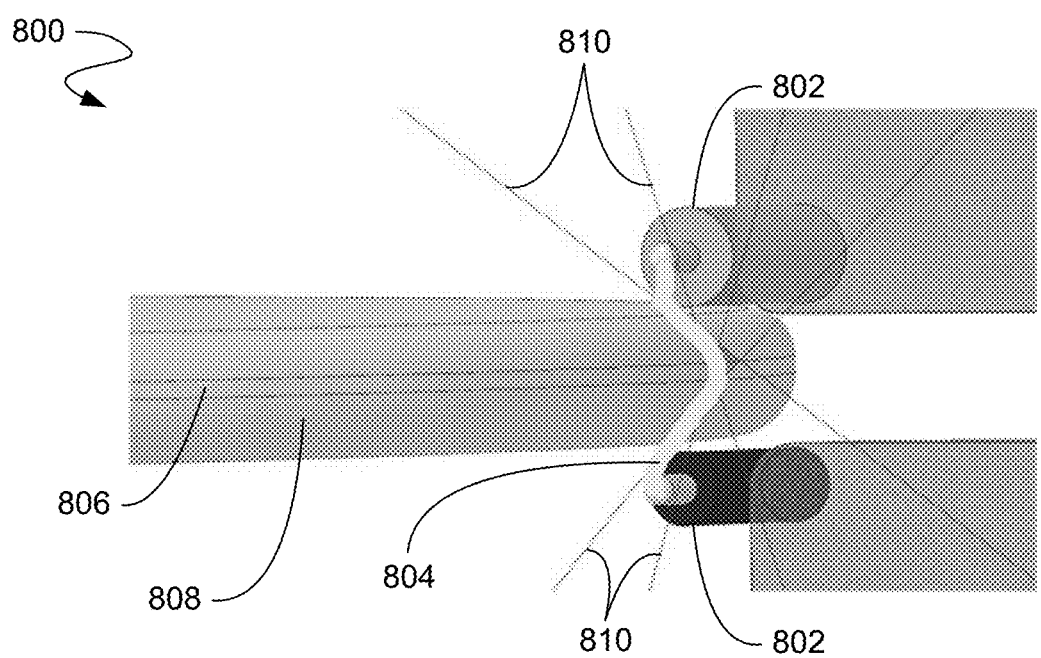
FIG. 8 shows a system for shaping an exposed edge with plasma according to one aspect of the present embodiments.

Referring to FIG. 8, a system 800 is shown for shaping an exposed edge with plasma according to one aspect of the present embodiments. High voltage electrodes 802 create a high density discharge 804 (e.g. plasma). The high density discharge 804 interacts with an exposed edge 806 of a glass substrate 808, removing any material extending into the high density discharge 804. In various embodiments, lasers 810 may be used to guide and shape the high density discharge 804 into any shape. For example, the high density discharge may be formed into a curvature. In some embodiments, additional lasers may also be used to remove material from the exposed edge 806. For example, the high density discharge 804 may remove some material from the exposed edge 806, and one or more additional lasers may also remove material from the exposed edge 806.

Figures 9, 10:
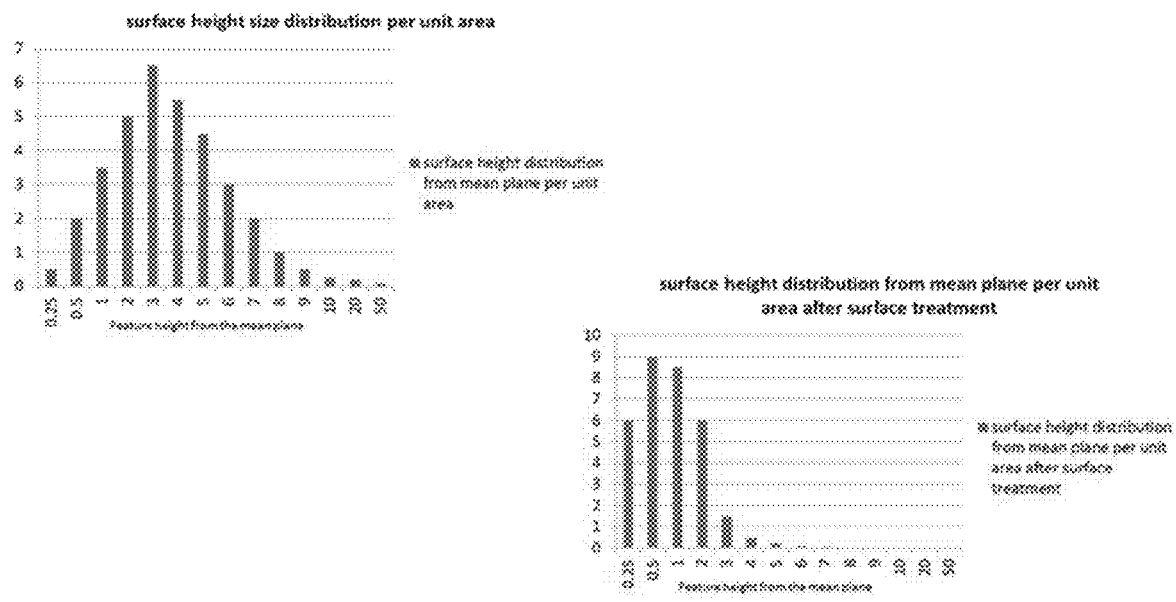
FIG. 9 shows surface finish height distributions before and after a polishing step in accordance with one aspect of the present embodiments.
FIG. 10 shows a system for shaping an annular edge of the glass substrate with a plasma torch in accordance with one aspect of the present embodiments.

Referring to FIG. 9, surface finish height distributions before and after a polishing step are illustrated according to one aspect of the present inventions. After the glass substrate has been cut and shaped, as previously described, edge polishing may be applied to meet finish and dimension goals. For example, according to embodiments described herein, edge surface roughness may be reduced to below 0.5 µm rms (root mean square).

As illustrated in FIG. 9, embodiments include edge polishing treatments that operate under the principle that the highest feature dimensions are smoothed and become redistributed into lower feature heights. As such, the first roughness histogram (entitled "surface height distribution per unit area") shows the distribution of heights of feature dimensions on the edge of the glass substrate before polishing. The second roughness histogram (entitled "surface height distribution from mean plane per unit area after surface treatment") shows the distribution of heights of feature dimensions on the edge of the glass substrate after polishing. Therefore, according to embodiments described herein, FIG. 9 shows that surface features with higher dimensions are reduced after a polishing step, resulting in less of a variation between features that are smaller after polishing.

In various embodiments, ablation methods may be used to polish the edge of the glass substrate. For example, laser guided plasma (described in FIG. 8) may be used to polish the annular surface edge of the glass substrate. The laser guided plasma may be tuned and directed to behave similar to lightning, and strike the highest features of the surface edge. As a result, the highest features will be ablated and reduced in height. As the ablation of the highest features continues, the surface edge of the glass substrate includes increasing numbers of smaller features with a more uniform height. This results in a roughness reduction that increases the smoothness of the annular edge of the glass substrate. In addition, in various embodiments, the laser guided plasma polish does not reshape the annular edge of the glass substrate. As such, the shape (e.g. roundness) of the annular edge of the glass substrate is not changed.

In further embodiments, thermal methods may be used to polish the edge of the glass substrate. For example, lasers may be directed (as previously described) onto the annular surface edge of the glass substrate. The lasers may be tuned to heat the surface edge of the glass substrate, thereby causing the surface edge to reflow. As a result, highest features will be reflowed and reduced in height. As the reflow of the highest features continues, the surface edge of the glass substrate includes increasing numbers of smaller features with a more uniform height. This results in a roughness reduction that increases the smoothness of the annular edge of the glass substrate. In addition, in various embodiments, the laser polish does not reshape the annular edge of the glass substrate. As such, the shape (e.g. roundness) of the annular edge of the glass substrate is not changed.

Referring to FIG. 10, a system 1000 is shown for shaping an annular edge of the glass substrate with a plasma torch according to one aspect of the present embodiments. A plasma torch 1002 projects energy onto an annular edge 1004 of a glass substrate 1006. For example, the plasma torch 1006 may generate an energy column (e.g. a high temperature gas) at the annular edge 1004 of the glass substrate.

As previously discussed, the annular edge 1004 includes an initial distribution of feature dimensions including higher feature dimensions and lower feature dimensions. The initial distribution of higher feature dimensions and lower feature dimensions forms a first roughness. The plasma torch 1006 heats the annular edge 1004 of the glass substrate 1006 causing the annular edge 1004 to reflow. The reflowing of the annular edge 1004 reduces the higher feature dimensions into lower feature dimensions, thereby reducing the first roughness to form a second roughness. As such, the smoothness of the annular edge 1004 is increased as the number of higher features is reduced and the number of lower features is increased.

In various embodiments, the second roughness may be below 0.5 μm rms. In some embodiments, the first roughness is reduced to the second roughness without changing the roundness of the annular edge 1004. As such, the roundness of the annular edge 1004 is unaffected by the reflowing. In further embodiments, the glass substrate 1006 is mounted onto a rotation device 1008 that rotates the annular edge 1004 of the glass substrate 1006 through the energy column formed by the plasma torch 1002.

In further embodiments, multiple energy columns may be applied to the annular edge 1004. For example, a first energy may be applied with a first energy source. The first energy source may be the plasma torch 1002 previously discussed, or the first energy source may be other energy sources such as lasers or guided plasma. Additional energy columns may also be applied to the annular edge 1004. For example, a second energy source 1010 and a third energy source 1012 may generate additional energy columns at the annular edge 1004. The additional energy columns further reduce the higher feature dimensions to the lower feature dimensions. The additional energy columns may be created from any combination of energy sources, including (but not limited to): hot gas generated and projected from a plasma torch, focused light generated and projected from a laser source, and laser guided plasma generated and projected from electrodes. In various embodiments, the annular edge 1004 may be rotated through the additional energy columns. In some embodiments, the roundness of the annular edge 1004 remains the same after applying a first energy from the first energy source 1002, the second energy from the second energy source 1010, and the third energy from the third energy source 1012.

Referring now to FIG. 11, another flow diagram in accordance with one aspect of the present embodiments is shown. At step 1110, an energy is projected onto an annular edge of a glass substrate, wherein the annular edge includes a first roughness. At step 1120, the first roughness is reduced to a second roughness with the energy, wherein the energy reduces the first roughness without changing a roundness of the annular edge of the glass substrate.

Referring now to FIG. 12, an additional flow diagram in accordance with one aspect of the present embodiments is shown. At step 1210, an energy column is generated at an edge of a glass substrate, wherein the edge of the glass substrate includes a distribution of feature dimensions including higher feature dimensions and lower feature dimensions. At step 1220, the edge of the glass substrate is rotated through the energy column. At step 1230, the edge of the glass substrate is reflowed with the energy column, wherein the reflowing reduces the higher feature dimensions to the lower feature dimensions.

Referring now to FIG. 13, another additional flow diagram in accordance with one aspect of the present embodiments is shown. At step 1310, a first energy, a second energy, and a third energy are applied to an annular edge of a glass substrate. At step 1320, the smoothness of the annular edge of the glass substrate is increased with the first energy, the second energy, and the third energy, wherein a roundness of the annular edge remains the same after the applying the first energy, the second energy, and the third energy, the annular edge of the glass substrate includes higher features and lower features, and increasing the smoothness of the annular edge reduces a number of the higher features to increase a number of the lower features.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
projecting plasma onto an annular edge of a glass substrate, wherein the annular edge has a first roughness;
directing at least one laser beam onto the annular edge; and
guiding the plasma with the at least one laser beam to reduce the first roughness to a second roughness with the plasma, wherein the plasma reduces the first roughness without changing a roundness of the annular edge of the glass substrate.

2. The method of claim 1, wherein the reducing includes ablating portions of the annular edge.

3. The method of claim 1, wherein the reducing includes applying heat to reflow the annular edge.

4. The method of claim 1, wherein the plasma is projected from a plasma torch.

5. The method of claim 1, wherein the second roughness is below 0.5 µm rms.

6. A method comprising:
  generating a plasma column at an edge of a glass substrate, wherein the edge of the glass substrate includes a distribution of feature dimensions including higher feature dimensions and lower feature dimensions;
  directing at least one laser beam onto the edge of the glass substrate;
  rotating the edge of the glass substrate through the plasma column; and
  guiding the plasma column with the at least one laser beam to heat and reflow the edge of the glass substrate, wherein the reflowing reduces the higher feature dimensions to the lower feature dimensions.

7. The method of claim 6, wherein a roundness of the edge of the glass substrate is unaffected by the reflowing.

8. The method of claim 6, further comprising:
  generating an additional energy column at the edge of the glass substrate, the additional energy column including at least one of a focused light beam and a plasma;
  rotating the edge of a glass substrate through the additional energy column; and
  further reducing the higher feature dimensions to the lower feature dimensions with the additional energy column.

9. The method of claim 8, wherein the further reducing includes ablating the higher feature dimensions.

10. The method of claim 8, wherein the additional energy column is laser guided plasma.

11. The method of claim 6, wherein the plasma column is generated from a plasma torch.

12. A method comprising:
  applying a first energy, a second energy, and a third energy to an annular edge of a glass substrate, the first energy including a plasma and the second energy and third energy each including a laser beam;
  using the second and the third energy to guide the first energy onto the edge of the glass substrate to increase smoothness of the annular edge of the glass substrate, wherein
    a roundness of the annular edge remains the same after the applying the first energy, the second energy, and the third energy,
    the annular edge of the glass substrate includes higher features and lower features, and
    increasing the smoothness of the annular edge reduces a number of the higher features to increase a number of the lower features.

13. The method of claim 12, further comprising rotating the annular edge of the glass substrate through the first energy, the second energy, and the third energy.

14. The method of claim 12, wherein the first energy is projected from a plasma torch.

15. The method of claim 12, wherein increasing the smoothness includes applying heat to reflow the annular edge of the glass substrate.

* * * * *